United States Patent
Kwon et al.

(10) Patent No.: US 8,952,635 B2
(45) Date of Patent: Feb. 10, 2015

(54) METHOD FOR USE IN CONTROLLING FREE PISTON STIRLING COOLERS AND HEAT PUMPS DRIVEN BY A LINEAR ALTERNATOR

(71) Applicant: Global Cooling, Inc., Athens, OH (US)

(72) Inventors: Yongrak Kwon, Athens, OH (US); Robert Lee Mash, II, Pomeroy, OH (US)

(73) Assignee: Global Cooling, Inc., Athens, OH (US)

( * ) Notice: Subject to any disclaimer, the term of this patent is extended or adjusted under 35 U.S.C. 154(b) by 206 days.

(21) Appl. No.: 13/647,706

(22) Filed: Oct. 9, 2012

(65) Prior Publication Data

US 2013/0088176 A1    Apr. 11, 2013

Related U.S. Application Data

(60) Provisional application No. 61/545,615, filed on Oct. 11, 2011.

(51) Int. Cl.
| | |
|---|---|
| *H02K 7/14* | (2006.01) |
| *H02M 5/40* | (2006.01) |
| *H02K 33/16* | (2006.01) |
| *H02P 6/00* | (2006.01) |

(52) U.S. Cl.
CPC ............... *H02K 7/14* (2013.01); *H02K 33/16* (2013.01); *H02P 6/006* (2013.01)
USPC ............ 318/3; 60/524; 60/518; 60/526; 62/6; 62/228.5; 62/228.1; 62/226; 700/13; 700/35

(58) Field of Classification Search
CPC .......... H02K 7/14; H02K 33/16; H02P 6/006; H02P 9/02
USPC .......... 318/3; 700/13, 35, 40, 73, 74, 98, 118; 382/154; 62/6, 228.5, 228.1, 226; 60/524, 518, 520
See application file for complete search history.

(56) References Cited

U.S. PATENT DOCUMENTS

| | | | | |
|---|---|---|---|---|
| 4,543,793 | A | * | 10/1985 | Chellis et al. ................ 62/6 |
| 5,018,357 | A | * | 5/1991 | Livingstone et al. ............ 62/6 |
| 5,342,176 | A | * | 8/1994 | Redlich .................. 417/212 |
| 5,813,235 | A | * | 9/1998 | Peterson ..................... 62/6 |
| 6,356,326 | B1 | * | 3/2002 | Tamura et al. ............ 349/138 |
| 6,446,444 | B1 | | 9/2002 | Chase et al. |
| 6,782,700 | B1 | * | 8/2004 | Unger et al. ............... 60/517 |
| 7,705,479 | B2 | | 4/2010 | Spenceley et al. |
| 2005/0039454 | A1 | * | 2/2005 | Shimizu et al. ............ 60/595 |
| 2006/0119350 | A1 | | 6/2006 | Berchowitz et al. |
| 2007/0256428 | A1 | * | 11/2007 | Unger et al. ................ 62/6 |
| 2011/0056196 | A1 | | 3/2011 | Berchowitz et al. |

* cited by examiner

*Primary Examiner* — Rita Leykin
(74) *Attorney, Agent, or Firm* — Frank H. Foster; Kremblas & Foster (57) ABSTRACT

A method for use in controlling a free piston Stirling machine having a cold end and a warm end and driven by a linear motor having an armature winding to which a drive voltage is applied. The method comprises (a) sensing internal mechanical collisions; (b) repeatedly sensing the temperature of the cold end, the temperature of the warm end and the drive voltage; (c) storing, as associated data, a value representing drive voltage, the temperature of the cold end and the temperature of the warm end at the time of sensed collisions; and (d) limiting the drive voltage to less than the drive voltage that was sensed at a collision and is stored in association with stored warm end and cold end temperatures that are proximate currently sensed warm end and cold end temperatures.

8 Claims, 3 Drawing Sheets

Fig. 4        ASSOCIATED DATA STORED IN RELATIONAL DATABASE

| SENSED COLLISIONS | DRIVE VOLTAGE | COLD END TEMPERATURE | WARM END TEMPERATURE |
|---|---|---|---|
| COLLISION 1 | $V_1$ | $T_{COLD-1}$ | $T_{WARM-1}$ |
| COLLISION 2 | $V_2$ | $T_{COLD-2}$ | $T_{WARM-2}$ |
| COLLISION 3 | $V_3$ | $T_{COLD-3}$ | $T_{WARM-3}$ |
| COLLISION n | $V_n$ | $T_{COLD-n}$ | $T_{WARM-n}$ |

| TIME | 6TH HARMONIC | 8TH HARMONIC | 10TH HARMONIC | 12TH HARMONIC |
|---|---|---|---|---|
| 1 | 1 | 0 | 1 | 1 |
| 2 | 1 | 1 | 1 | 1 |
| 3 | 1 | 1 | 0 | 1 |
| 4 | 0 | 1 | 1 | 1 |

Fig. 5

METHOD FOR USE IN CONTROLLING FREE PISTON STIRLING COOLERS AND HEAT PUMPS DRIVEN BY A LINEAR ALTERNATOR

CROSS-REFERENCES TO RELATED APPLICATIONS

This application claims the benefit of U.S. Provisional Application No. 61/545,615 filed Oct. 11, 2011.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

This invention relates generally to free piston Stirling heat pumps and coolers and more particularly relates to improving the controllability of linear motor driven free-piston Stirling heat pumps and coolers to extract the maximum heat moving capability of the machine in a reliable and repeatable manner but to do so in a manner that avoids damaging collisions of its internal, reciprocating components with its internal stationary components.

Stirling cycle machines have been known for nearly two centuries but in recent decades have been the subject of considerable development because they offer important advantages. Some modern versions are free piston Stirling cycle machines are driven by a linear motor to operate as heat pumps and coolers. However, Stirling heat pumps and Stirling coolers are the same fundamental machines. In both cases the machine has what are often termed a warm end or warm side and a cold end or cold side. The adjectives warmer and colder would be more applicable because they signify the relative temperatures of two spaced apart regions of the machine. The operation of the Stirling machine transfers ("pumps") heat from the cold end to the warm end. Associated with the cold end is a heat acceptor which transfers heat into the machine. Similarly, associated with the warm end is a heat rejector which transfers heat out of the machine. When a Stirling machine, such as a cryocooler, is used to cool a mass to a temperature below the ambient temperature, it is commonly referred to as a cooler. If a Stirling machine is used to heat a mass above its ambient temperature, such as the air within a room, it is commonly referred to as a heat pump. But in both cases the Stirling machine is pumping heat from its cold end to its warm end so it is cooling its cold end by pumping heat to its warm end. Consequently, as used in the description of this invention, the term cooler includes a heat pump and the term heat pump includes a cooler.

Stirling coolers have a power piston and sometimes a displacer. The power piston is cyclically driven by a prime mover, such as a linear electromagnetic motor. Both the power piston, sometimes referred to as the piston, and a displacer reciprocate within a cylinder. Both the power piston and the displacer function as pistons, the latter cyclically and alternatingly displacing the internal working gas between the warm end and the cold end. Driving the power piston in reciprocation also causes the displacer to reciprocate for reasons well known to those skilled in the art. However, if the linear motor drives these pistons in an excessive stroke (or amplitude which equals one half the stroke), either piston or both can collide with internal components of the Stirling machine. When such collisions have a sufficient impact, the collisions cause severe damage to the internal components.

As is well known in the art, linear motors generally drive free-piston Stirling heat pumps by applying an AC voltage at a particular frequency to the terminals of the linear motor. The amplitude of the piston reciprocation is primarily determined by the amplitude of that voltage. More specifically, the instantaneous amplitude of the piston is directly proportional to the amplitude of the AC voltage applied to the armature of the linear motor. However, the cold-side and warm-side temperatures also influence the amplitude of reciprocation but those temperatures vary at a rate that is much less than several periods of piston reciprocation. Therefore, a Stirling heat pump that is operating without any collisions at one coexisting pair of warm side and cold temperatures and an associated linear motor drive voltage may suffer collisions at the same motor drive voltage when there is a different coexisting pair of warm side and cold side temperatures.

This variation in the motor drive voltage at which collisions occur is important because it is desirable to drive the Stirling heat pump at its maximum amplitude, but without collisions, in order to maximize its efficiency and to maximize its rate of pumping heat. Maximizing its heat pumping rate minimizes the time needed to bring the mass being heated or cooled (the "target") to the desired temperature. Most heat pump control systems have a set point temperature, which is the desired temperature of the target, and a currently sensed target temperature. Maximizing the heat pumping rate by maximizing the motor drive voltage brings the target temperature to the set point temperature in the minimum time. But damaging collisions must be avoided.

Because the linear motor drive voltage that causes collisions can vary with warm side and cold side temperatures, it is difficult to know what maximum voltage is possible for all operating conditions. This is especially a problem during startup of the machine from ambient temperature at both its cold side and its warm side. During this transient startup, maximizing the heat pumping rate is most desirable but the variations in the cold side and warm side temperatures are greatest because they vary all the way from their initial ambient temperatures to their ultimate steady state temperatures. Current practice often resorts to a slowly ramping voltage applied to the linear motor in order to prevent the machine from being over-stroked at warmer temperatures. But such a slow increase in motor voltage means that the heat pump is operating below, usually far below, its maximum heat pumping capability. Another control possibility determines the piston amplitude from the back EMF of the linear motor and maintains the amplitude below a predetermined amplitude at which collision occurs. Both these techniques suffer from changing temperatures that alter the behavior of the machine. In the first case, due to thermal load, the ramp time may not be sufficient to bring the machine to the required temperatures before full power can be applied. In the second, the temperature effects on the linear motor may alter the relationship between back EMF and amplitude thus reducing the precision of the stroke control. Of course, in any scheme, it is possible to simply allow sufficient safety margins for the piston motions without the possibility of collision by simply driving the pistons at amplitudes that are far below an amplitude that would cause a collision. But this approach results in dead space leading to unused heat transfer rate capacity since the lift or the rate at which is heat moved is dependent on the square of the piston amplitude. In some applications, such as deep temperature freezers, it is important to obtain the fastest cool-down both initially and after door openings in order to limit the exposure of the high value contents of the freezer to extended temperature fluctuations. This can only be achieved by operating the free-piston cooling machine at its maximum possible capacity, which is also the maximum allowable piston amplitude. A further difficulty with current control systems is that, over time, electronic and machine parameters change leading to incorrect control parameters. This can be due to aging or stressing of electrical components or due to gas leakage from the Stirling machine.

An ideal control system for a free-piston, linear alternator driven Stirling engine would therefore have the following attributes:

a. Maximum piston amplitude should be achieved at any combination of cold-side and warm-side temperatures.

b. Self-calibration owing to tolerances in the components of the free-piston Stirling heat pump, linear motor and control electronics.

c. Self-recalibration when the control parameters have changed due to aging, wear or gas leakage and are no longer accurate enough to maintain the machine within its operating envelope.

BRIEF SUMMARY OF THE INVENTION

The invention is a method for use in controlling a free piston Stirling machine driven by a linear motor having an armature winding to which a drive voltage is applied, the drive voltage being controlled by a digital data processing control system, the Stirling machine having a cold end and a warm end. The method comprises (a) sensing internal mechanical collisions; (b) repeatedly sensing the temperature of the cold end, the temperature of the warm end and the drive voltage; (c) storing, as associated data, a value representing drive voltage, the temperature of the cold end and the temperature of the warm end at the time of sensed collisions; and (d) limiting the drive voltage to less than the drive voltage that was sensed at a collision and is stored in association with stored warm end and cold end temperatures that are proximate currently sensed warm end and cold end temperatures.

The preferred embodiment of the invention uses an accelerometer that informs a control circuit when collisions occur at the extremes of the amplitudes of the internal moving parts of a linear motor driven free-piston Stirling heat pump, referred to from now on as a free-piston Stirling cooler (FPSC). The control circuit memorizes the cold and warm temperatures and voltage when the collision is reached. The voltage associated with this maximum amplitude is termed the over-stroke voltage and a threshold voltage is set at some approach voltage that is less than the collision voltage. Since there are many combinations of cold and warm temperature and each combination may result in a different over-stroke voltage, it is necessary to inform the control strategy of the relationship between the over-stroke voltage and the cold and warm temperatures. This relationship is referred to as a surface map of over-stroke voltage versus cold and warm temperatures and is generated by operating the FPSC in a search-mode or calibration mode through a cold-head temperature starting at ambient temperature and ending below some target temperature, say −100° C. In this mode, the FPSC is driven aggressively using only the accelerometer to determine the over-stroke condition. When over-stroke occurs, the voltage is recorded together with the cold and warm temperatures and the control system backs off the voltage until the machine ceases to collide with its end stops. The voltage is then ramped up again to repeat the process. This procedure continues every 30 seconds or so until the surface map of over-stroke voltage versus cold and warm temperatures is completed. Once the surface map has been generated and stored in the control circuitry, the control system reverts to controlling the FPSC based on a threshold voltage computed from the current cold end and warm end temperatures. The threshold voltage is determined from the surface map and is set less than the over-stroke voltage. From time to time the accelerometer is interrogated to see if over-stroke is occurring. If so, the control system can re-calibrate according to the procedure just described.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

Figure 1:
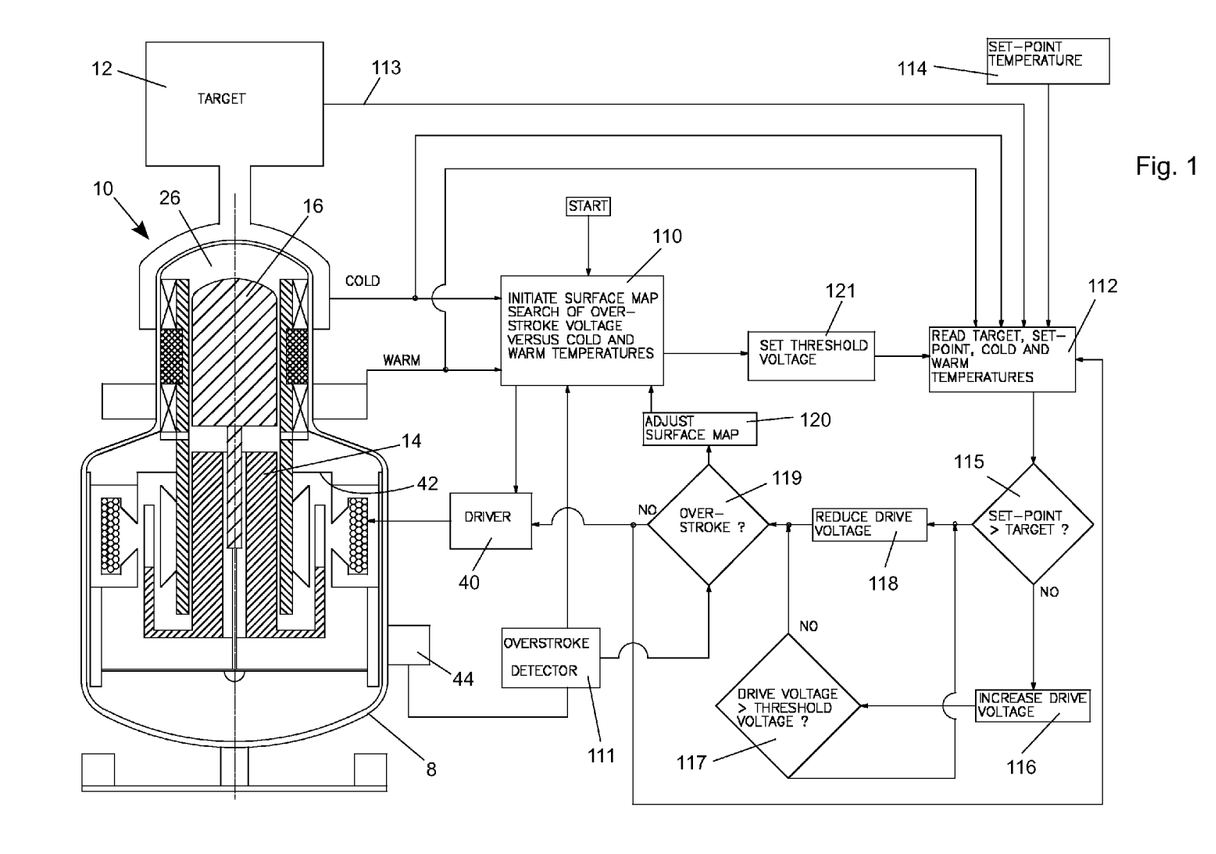
FIG. 1 is a schematic and flow chart diagram of the preferred embodiment of the invention.

FIG. 1 shows the basic elements of the control method as applied to a free piston Stirling cooler 10. The method of the invention is applicable to many different free piston Stirling coolers known in the prior art. The free piston Stirling cooler illustrated in FIG. 1 is known in the prior art and the prior art portion of FIG. 1 is illustrated in FIG. 2.

Prior Art Stirling Cooler Example

Figure 2:
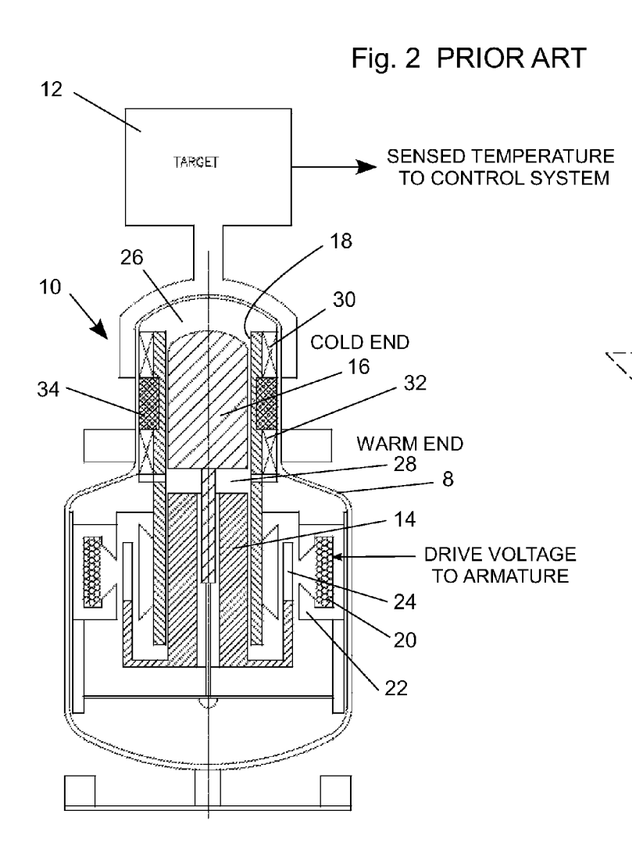
FIG. 2 is a schematic diagram of a prior art Stirling cooler which can be controlled by the method of the present invention.

Referring to FIG. 2, the free piston Stirling cooler (FPSC) 10 is housed in a casing 8 and has its cold end thermally connected to a target 12 for cooling the target 12. A typical target 12 is the interior of an insulated compartment for containing biological samples that are cooled to cryogenic temperatures. In most prior art coolers the temperature of the target 12 is continuously monitored or sensed and the sensed temperature is transmitted to a digital data processing control system. A piston 14 and a displacer 16 reciprocate within a cylinder 18. The piston 14 is driven by a linear motor which includes an armature winding 20 wound in a core 22 constructed of a material with a high magnetic permeability. The linear motor also includes permanent magnets 24 which are mechanically connected to the piston 14 so that an AC current through the armature winding 20 will generate an alternating magnetic field that drives the piston 14 in reciprocation. The cooler 10 also has a work space which includes an expansion space 26 and a compression space 28. As the power piston 14 reciprocates within the work space, the pressure in the work space varies cyclically and this pressure variation drives the displacer piston 16 in reciprocation. A heat accepting heat exchanger 30 at the cold end transfers heat from the target 12 into the machine and a heat rejecting heat exchanger 32 at the warm end transfers heat out of the machine. The displacer 16 causes a working gas in the work space to shuttle back and forth between expansion space 26 and compression space 28 through a relatively low flow resistance path through the heat acceptor 30, a regenerator 34 and the heat rejector 32.

Theory of Operation of the Invention

Referring to FIG. 1, the control method begins by driving the FPSC to a point where the internal moving parts just begin to strike their end stops. The output of an accelerometer is used by the over-stroke detector to detect the over-stroke condition. An over-stroke voltage and cold and warm temperatures are noted at the over-stroke condition. This procedure continues as the cold head falls in temperature in order to build a three-dimensional (surface) map with cold and warm temperatures being the independent variables and the over-stroke voltage being the dependent variable. Once the surface map has been generated, the threshold voltage is set for each combination of cold and warm temperatures. The threshold voltage is set less than the over-stroke voltage. The control system is now calibrated and begins to operate the machine based on the difference between the target temperature and the set-point temperature, commonly known as the error. If this difference is negative (target temperature warmer than set point temperature), the control system repeatedly increments the drive voltage by an amount that is proportional to the difference, for example using the well known proportional-integral-derivative (PID) controller algorithm, but does not increase the drive voltage beyond the limit of the threshold voltage for the currently existing cold and warm temperatures. The threshold voltage is a function of the cold and warm temperatures so these two items must be continually read by the control circuit. As the target temperature is approached, the drive voltage is reduced in order to bring the lift (heat removed by the FPSC) close to the heat leak of the target. Once the lift and target heat leak are identical (within close tolerance), the system is essentially at steady state and the target temperature is maintained.

Also shown in FIG. 1 is the interrogation procedure of whether the FPSC is over-stroking for reasons due to internal changes such as wear, leakage of the working gas or any degradation or change in components. This interrogation happens over a longer time frame since degradation is typically a slow process.

Figure 3:
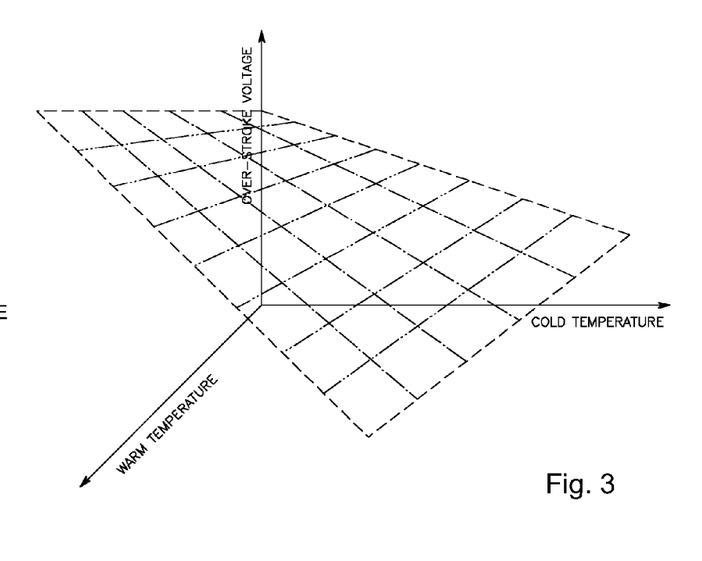
FIG. 3 is a graphical illustration of a surface map depicting a relational database that is generated by the method of the invention during a calibration mode of operation but which can also be updated during normal operation in a useful work mode.

FIG. 3 shows the over-stroke voltage map. The over-stroke voltage is the drive voltage at the point where the piston is driven to an amplitude at which the piston or the displacer reach the limit of their travel within the machine. This limit voltage is a function of the cold (acceptor) and warm (rejecter) temperatures of the machine.

Still referring to FIG. 1, the piston 14 is driven by the linear motor at a fixed frequency with an amplitude determined by the voltage provided by the driver 40. The piston amplitude also depends on the temperatures of the cold side and the warm side. The displacer 16, is driven by the pressure changes caused by reciprocation of the piston 14 and the displacer amplitude is also a function of the cold and warm temperatures. The maximum amplitude to which the piston 14 can be driven is determined by either a collision against the displacer or against its mechanical stop at 42 or the displacer hitting its mechanical stop at the limit of the expansion space 26. The displacer maximum amplitude is determined by collisions against the piston or against the casing of the FPSC at the expansion space at 26. If the drive voltage is increased sufficiently slowly, then the velocity at which the collisions occur will become vanishingly small because they occur at the point of motion reversal, which is also the point of zero piston velocity. A collision sensor, preferably an accelerometer 44, is attached to the casing 8. Thus, increasing the drive voltage until the accelerometer 44 begins to detect collisions results in a mild mechanical shock to the moving parts, which will not damage them. The invention uses this physical fact to calibrate the maximum voltage that can be applied to the machine for any given cold or warm temperature combination.

On first power up a calibration mode is initiated. The control circuit initiates a procedure 110 that drives the piston to an amplitude where incipient collisions are determined by the over-stroke detector circuit 111. When over-stroke is detected, the drive voltage is stored as the over-stroke voltage and is associated with the cold and warm temperatures at the condition of over-stroke. The over-stroke voltage and the cold and warm temperatures are stored in non-volatile memory in the control circuit. The actual over-stroke condition may be determined by a number of methods but it is preferably detected using a fast Fourier transform analysis of casing vibration in order to detect the presence of higher order harmonics above the fundamental operating frequency of the Stirling cooler. The preferred method is described below.

During this first power up mode, the control circuit maintains the FPSC close to the over-stroke limit by approaching the limit every 30 seconds (this time is arbitrary but has been found to work well) while recording the cold and warm temperatures and the over-stroke voltage until the cold side reaches a minimum temperature, say minus 100° C. The temperature and voltage data is used to build the over-stroke voltage surface map as shown in FIG. 3. As can be seen from FIG. 3, there is a unique over-stroke voltage associated with any combination of cold and warm side temperatures. The generation of the over-stroke voltage surface map is the learning phase of the control algorithm.

Once the learning phase calibration mode has been completed, the controller sets the threshold voltage at 121, which is a fraction, e.g. 0.8 to 0.9 (80% to 90%) of the over-stroke voltage. This fraction is determined empirically and is selected so that when the FPSC is driven at the threshold voltage, there is no perceptible collision with the mechanical stops within the machine. The threshold voltage is now also a function of the cold and warm side temperatures but represents a surface displaced to a slightly lower drive voltage from the over-stroke voltage surface shown in FIG. 3.

The control circuit now moves to a control algorithm that starts with process 112 where the cold and warm side temperatures are read in conjunction with the target temperature 113 and the desired outcome, the set point at 114. An error signal is computed from the difference between the set-point and target temperatures. If the set-point temperature is below the target temperature (i.e., the target temperature is warmer than the desired temperature), determined at 115, then the control circuit registers that the voltage should be increased 116 by an amount proportional to the error signal, and the new drive voltage is compared to the threshold voltage at 117. If the new drive voltage is greater than the threshold voltage, the voltage is reduced at 118 by a factor less than 1.0 to a value less than or equal to the threshold voltage. Occasionally or at every voltage update cycle, the control circuit tests for an over-stroke condition at 119. If an over-stroke condition is determined, the surface map is adjusted or updated with the new value at 120. If no over-stroke is determined, driver 40 is set with a new voltage level that is applied to the linear motor, thus increasing the amplitude of the piston 14 and by so doing, increasing the lift or heat being removed from the target 12.

Additional Description

Collision detection is preferably performed using an accelerometer to detect collisions but can alternatively be performed by detecting casing velocity or displacement, for example with a microphone. Collision detection is possible because, in the absence of a collision, there is a strong fundamental frequency content in the casing motion with relatively little harmonic content. The reciprocation is essentially and approximately sinusoidal. When there is a collision, the collision causes a spike or sharp jar or movement of the casing which generates a sudden increase in the higher frequency content, similar to a hammer hitting an interior object that is fixed to the casing. An F=ma force is applied to the casing by the sudden deceleration of the reciprocating piston. A collision of the piston with the displacer, a collision of two pistons, also applies this force of collision to the casing through the gas within the Stirling cooler and by frictional forces against the cylinders. The motion of the casing resulting from a collision can be very small movements and includes the movement in the manner that sound is transmitted through a medium, such as the casing metal, by compressions and rarefactions of the casing metal.

Because collisions generate a characteristic signature identified by the presence of higher frequency harmonics of the cooler's fundamental operating frequency, one of the Fast Fourier transform algorithms that are well know in the prior art can be used to detect the presence of a collision. These algorithms are run with a digital data processor and can be used to detect harmonic content by decomposing a sequence of values (e.g. an analog waveform) into its components of different frequencies. Detection of the harmonic components that characterize a collision informs the process of the presence of a collision. In order to detect the harmonic content, an analog signal representing casing motion is obtained from the accelerometer or other sensor, converted to digital data and then that data is transformed to data representing the harmonic content in the manner well known in the prior art.

A collision is detected by determining whether there is sufficient harmonic content relatively far above the fundamental frequency to indicate the occurrence of a collision. How much is sufficient is, of course, a matter of engineering judgment. The preferred method for examining the harmonic content in order to detect a collision evaluates and stores neighboring even harmonics far out from the fundamental when the machine is operating normally in the absence of any collisions.

For example, the respective amplitudes of the $6^{th}$, $8^{th}$, $10^{th}$ and $12^{th}$ harmonics, under the condition of no collisions, are obtained and stored. The absence of collisions can be manually detected by an observer, such as by the absence of the sound made by a collision or by feeling the casing with a human hand. After storing the respective amplitudes of the four neighboring harmonics in the absence of a collision, the control system is prepared to monitor the casing for sensing whether a collision has occurred. The amplitude of the adjacent odd harmonic above and the amplitude of the adjacent odd harmonic below each of the even harmonics is detected, stored and compared to the amplitude of the stored, neighboring, interposed even harmonics. That sequence of detecting, storing and comparing is performed four times for four different, spaced apart, time intervals. For example, the amplitude of the $5^{th}$ harmonic and the amplitude of the $7^{th}$ harmonic are compared to the amplitude of the $6^{th}$ harmonic. Similarly, the amplitude of the $7^{th}$ harmonic and the amplitude of the $9^{th}$ harmonic are compared to the amplitude of the $8^{th}$ harmonic. That comparison is made for the odd harmonics on each side of all four even harmonics.

Figure 5:
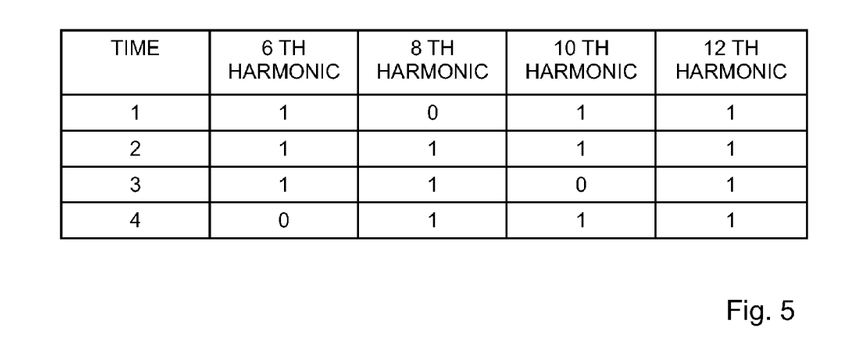
FIG. 5 is a table that is generated for use in determining whether a collision has been detected.

The data from these comparisons is used in the following manner to construct in digital memory a matrix such as illustrated in FIG. 5. In the matrix as illustrated, each row represents a different time at which harmonic amplitudes are detected by the fast Fourier transform algorithm. The columns represent the results of the comparisons for each even harmonic at the four different times. Either a number 0 or a number 1 is entered in each cell of the matrix. Those numbers are determined from the comparison as follows. The amplitude of each stored even harmonic (determined and stored in the absence of a collision) is compared to the amplitude of the odd harmonic on each side of the even harmonic. If the amplitude of both odd harmonics exceed the amplitude of the interposed even harmonic, then a 1 is stored in a matrix cell. If the amplitude of either one of the odd harmonics does not exceed the amplitude of the interposed even harmonic, then a 0 is stored in the matrix cell. For the first instance of time at which the amplitudes of the odd harmonics are detected and compared, the cells of the entire row 1 is filled with a 1 or a 0, depending upon the results of the comparisons. For example, if, at the first time, the amplitude of both the $5^{th}$ and the $7^{th}$ harmonics exceed the stored amplitude of the $6^{th}$ harmonic, a 1 is entered into the top left cell. Continuing the example, if one or both of the amplitudes of the $7^{th}$ and the $9^{th}$ harmonics is less than the stored amplitude of the $8^{th}$ harmonic, a 0 (zero) is stored in the matrix. The same comparisons are then made for the harmonics on the two sides of the $10^{th}$ and $12^{th}$ harmonics to complete row 1 for the first time at which the harmonic amplitudes are detected. At a later time, the process is repeated for the second time. Then the process is again repeated for the third time to complete the third row and still later for a fourth time to complete the fourth row. Detections of these harmonics are done as fast as the processor will do them, so each subsequent detection is done at another cycle of the processor clock. This is simply to remove spurious signals. The detections may also be done in some multiple of the processor cycle time so long as they are completed within ten cycles of the piston motions with fewer cycles being better since fewer collisions occur before the algorithm for detection can be computed. The matrix is then evaluated in the following manner to determine whether a collision was detected. Preferably, if there are at least 12 numbers 1 in the 16 cell matrix (i.e. 75%), then that is interpreted as the presence of a collision. If there are fewer than 12 numbers 1 in the 16 cell matrix, that is interpreted as the absence of a collision. Of course the particular harmonics that are saved and compared and the quantity of them can be varied to accomplish a detection of a collision using the principles illustrated by the example. A further alternative is to signal an occurrence of a collision if a majority of the cells in the matrix contain a number 1.

In the calibration mode, the machine is operated over transient ranges of heat acceptor and heat rejector temperatures such as occur during a startup of the machine when the cold end and warm end are both initially at ambient temperatures. As the cold end and warm end temperatures change toward their steady state, normal, operating temperatures, the method of the invention at times increases or ramps up the drive voltage applied to the armature winding of the linear motor until a collision is detected.

The amount and rate at which the drive voltage is increased is not critical but the rate of change of the drive voltage should be gradual enough to avoid damaging collisions and not create instabilities. The design operating voltage and the fundamental frequency of operation of the Stirling cooler can be used to determine a desirable rate of voltage increase.

Because the amplitude of piston reciprocation in a free piston Stirling cooler is proportional to the drive voltage, a change in the drive voltage will be proportional to a resulting change in the amplitude. Preferably, the drive voltage should be increased in increments of 5% or less of the nominal designed drive voltage and the voltage should be increased by that amount at a rate no faster than once over several periods of the fundamental operating frequency. A 1% increase over several periods would be safer. As a more specific example, a Stirling cooler operating at 60 Hz and having a 220 volt nominal drive voltage, could have its drive voltage ramped up at the rate of 2.2 volts (1% of 220V) every 1.67 seconds (100 periods); i.e. 1.3 volts per second. When a collision is detected, the coexisting value representing the drive voltage, the cold end temperature and the warm end temperature are stored, as associated data, in a relational database. Coexisting means that the associated two temperatures and value representing the drive voltage all existed substantially contemporaneously at the time of the sensed collision. Of course some time delay or differences between them can be tolerated when those time delays cause no unacceptable deterioration of the effectiveness of the method.

After a collision is detected, the drive voltage is reduced for a waiting time interval, such as 30 seconds, to allow the temperatures to change so that data can be sensed at a different combination of cold end and warm end temperatures. The amount of decrease of the drive voltage following a collision is also not critical because, if the voltage was ramped up at a sufficiently slow rate that the detected collision does not cause damage, then a small decrease in drive voltage will avoid further collisions the waiting time interval so long as the temperature changes are not too large during the waiting time interval. However, it is desirable that the drive voltage be decreased by enough during the waiting time interval that the drive voltage can be maintained at its decreased value for a waiting time interval that is sufficiently long to allow a meaningful change in temperatures without the temperature changes being enough to cause a collision. That will provide a reasonable distribution of data points on the three dimensional map. For example, the drive voltage should be reduced by 20% or less, such as 10%, for 30 seconds until the next ramp up of the drive voltage to produce the next collision and data point on the three dimensional map.

Figure 4:
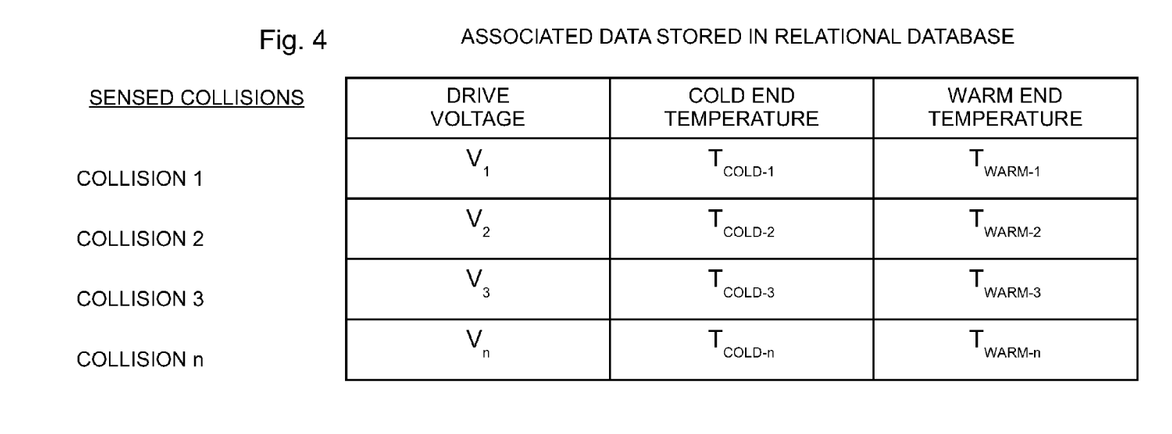
FIG. 4 is a table representing a relational database, also illustrated by FIG. 3.

The process of ramping up the drive voltage, sensing an internal collision and storing the three associated values during the calibration mode is repeated for a plurality of sensed collisions as the machine is operated over the transient range of cold end heat acceptor temperatures and warm end heat rejector temperatures. The storing of these sensed data sets generates a relational database representing the three dimensional data map (FIG. 3) of associated data over an operating temperature range of the Stirling machine. FIG. 4 illustrates the stored relational data base in which each sensed collision is shown in a row with its associated stored data for a plurality of sensed collisions listed down the columns.

The temperature sensors are preferably located externally to the Stirling machine on the heat acceptor and heat rejector because it is desirable to sense the temperature at the cold end or heat acceptor part of the machine and the temperature at the warm end or heat rejector part of the machine. Because the heat acceptor and heat rejector are from copper, the external temperature is very close to the internal temperature and the thermal inertia (or capacity) of the acceptor and rejector are small compared to the thermal inertia of the target so there is no appreciable delay in the determination of the acceptor and rejector temperatures.

As an alternative, it is should be possible to perform the calibration mode and its data collection and storage over the same temperature ranges but in the reverse direction by beginning at steady state operating temperatures and then allowing the temperatures to change toward ambient temperatures. However, this is not recommended and is less practical.

After the relational database of associated data is stored while in the calibration mode, the Stirling cooler is operated in a useful work mode. In the useful work mode, the warm end temperature and the cold end temperature continue to be repeatedly sensed to determine their current temperatures. The database is repeatedly interrogated to retrieve the stored value representing the drive voltage that was sensed in the calibration mode and is stored in association with stored warm end and cold end temperatures that are proximate the currently sensed warm end and cold end temperatures. The stored and retrieved drive voltage is then used as a maximum limit for the currently applied drive voltage. More specifically, the drive voltage applied to the linear alternator in the useful work mode is limited to less than the drive voltage that was sensed at the time of a collision in a calibration mode and was stored in association with warm end and cold end temperatures at the time of a sensed collision.

The term "proximate" is used in recognition of the fact that the data stored in the relational data base, illustrated in FIG. 4 and represented by the 3-D data map of FIG. 3, is a series of discrete stored values and has discontinuities between those values. However, the currently sensed values of cold end and warm end temperatures can fall over an analog continuum of temperatures over the temperature operating range of the Stirling cooler. Consequently, when interrogating the data base to retrieve the data for a drive voltage limit, the method can be practiced by selecting those values of warm end temperature and cold end temperature that are closest (most proximate) to the currently sensed warm end and cold end temperatures. However, as known in the computing arts, there are algorithms for interpolating between the discrete values of cold and warm end temperatures to compute an interpolated value representing a sensed drive voltage value at a collision that corresponds to the interpolated, stored temperatures. Because that is more accurate, using an interpolation algorithm to determine the proximate temperatures and their associated drive voltage is preferred.

The important drive voltages are the overstroke voltage and the threshold voltage. The overstroke voltage is the drive voltage at which a collision is detected. The threshold voltage is a voltage that is less than the overstroke voltage by an amount sufficient to provide a safety margin that assures that there will be no collisions at the warm end and cold end temperatures associated with the sensed overstroke voltage. Although the size of the safety margin is dependent upon the particular machine and engineering judgment, a threshold voltage of 80% or 90% of the overstroke voltage is believed to be safe, practical and efficient. As previously described, the threshold voltage is used as the drive voltage limit. It should be apparent that the stored value representing the overstroke voltage can be the overstroke voltage itself or alternatively the threshold voltage. The difference is simply a matter of computing the threshold voltage before or after the overstroke voltage is sensed. So long as the threshold voltage has a known relationship to the overstroke voltage, either can be stored in the relational database. Therefore, the stored voltage is termed the value representing the overstroke voltage because both the overstroke voltage and the threshold voltage represent the overstroke voltage. Each is known from the other by their known relationship.

The fundamental concept of the invention is to store, during a calibration mode, associated data sets, each data set representing (1) a drive voltage, (2) a cold end temperature, and (3) a warm end temperature at which a collision occurs and then, during a useful work mode, using the stored data to generate and apply a drive voltage limit that is the maximum drive voltage that the control system can apply to the linear motor. This concept can be incorporated as a drive voltage limit into various prior art control systems and algorithms that control a Stirling cooler. The preferred prior art control algorithm to which the limit of the invention is applied is the Proportional-Integral-Derivative (PID) control algorithm. In brief summary, the PID control algorithm inputs the set point temperature and the current target temperature to provide an error. The PID control algorithm calculates an increment or decrement for the drive voltage which is an amount that is a function of the error, principally proportional to the error, and in a direction to bring the target temperature closer to the set point temperature. These increments and decrements are repetitively applied to bring the target temperature to the set point temperature. However, with the invention a limit is interposed in the process to assure that the drive voltage never reaches the overstroke voltage. Before the drive voltage is increased by the PID control algorithm, the process determines the threshold voltage for the current combination of warm end temperature and cold end temperature. If the drive voltage increment computed by the PID control algorithm would increase the drive voltage beyond the threshold voltage, the drive voltage increment is limited to a value that does not exceed the threshold voltage. If the PID control algorithm computes an increment that would not increase the drive voltage beyond the threshold voltage, then the drive voltage is incremented in the amount computed by the PID control algorithm. Of course when the PID control algorithm computes a decrement in drive voltage that will not cause the drive voltage to exceed the threshold voltage.

A Stirling cooler that uses the method of the invention would usually be operated in its calibration mode and its data stored before the cooler leaves its manufacturer. The principal advantage of the invention is realized when the user initiates operation of the machine in its useful work mode. At that stage the cooler begins operation with the target, cool end and warm end at ambient temperature. The error is very large and any control algorithm must be limited in some manner as described above to prevent collisions during this cool down of the cooler. An important advantage of the invention is that the drive voltage limit, which the invention applies, is always during the entire cool down process, at the highest possible drive voltage and therefore the machine arrives in the least time at its steady state operation.

As stated above, various changes can occur in a cooler as it ages. Some of these changes can vary the drive voltage that causes a collision at a particular combination of cold end and warm end temperatures. Therefore it is desirable that there be a recalibration of the stored data. Although the entire initial calibration process can be performed from time to time, the database can be updated even during operation of the cooler in its useful work mode. In order to accomplish the latter process, the method can continuously monitor for collisions. Collisions can be sensed during the useful work mode and the drive voltage at the time of a sensed collision can be sensed during the useful work mode. The sensed drive voltage as well as the temperature of the heat acceptor and the temperature of the heat rejector, which are normally also monitored during the useful work mode, are then used to update the relational data base by storing them as a related data set.

Additionally or alternatively, a modified calibration process can be performed while the cooler is engaged in useful work. While the cooler is maintaining the target temperature at the set point temperature, the drive voltage can be increased until a collision occurs and the data stored in the manner described above for the initial calibration mode. The difference is that in this modified calibration mode, the calibration process is performed over a very narrow range of temperatures on either or both sides of the set point temperature. Each time a collision is detected, the process checks to see if the threshold voltage at the current combination of warm end temperature and cold end temperature is still the same as was previously stored in memory and update the data if it is not. In other words, at time intervals, such a hours, days or months, the process performs the calibration operation within a small range around the current operating temperatures.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A method for use in controlling a free piston Stirling machine driven by a linear motor having an armature winding to which a drive voltage is applied, the drive voltage being controlled by a digital data processing control system, the Stirling machine having a heat acceptor, a heat rejector and at least one periodically reciprocating piston, the method comprising
   (a) calibrating the control system by
      (i) increasing the drive voltage until a collision of a piston or displacer with an internal component of the Stirling machine occurs;
      (ii) sensing the collision;
      (iii) sensing in response to the sensed collision, coexisting calibration values of the temperature of the heat acceptor, the temperature of the heat rejector and a value representing the drive voltage;
      (iv) storing, as a related data set, the sensed coexisting calibration values;
   (b) repeating the calibrating step for a plurality of sensed collisions as the machine is operated over a transient range of heat acceptor temperatures and heat rejector temperatures and storing the sensed data sets to generate a relational database representing a three dimensional data map of associated data over an operating range of the Stirling machine;
   (c) driving the linear alternator in a useful work mode by
      (i) repeatedly sensing coexisting operational values of the temperature of the heat acceptor and the temperature of the heat rejector;
      (ii) interrogating the relational database to retrieve a stored value representing the drive voltage at a stored pair of coexisting calibration values of heat acceptor temperatures and heat rejector temperatures that are proximate the sensed coexisting operational values of the temperature of the heat acceptor and the temperature of the heat rejector; and (iii) applying to the armature winding a drive voltage that is less than the drive voltage sensed during calibrating and derived from the retrieved stored value representing the drive voltage.

2. A method in accordance with claim 1 and further comprising
   (a) sensing collisions of a piston or displacer with an internal component of the Stirling machine at times during the useful work mode;
   (b) sensing the drive voltage at the time of a sensed collision during the useful work mode; and
   (c) updating the relational data base by storing, as a related data set, any sensed coexisting operational values of a value representing the drive voltage, the temperature of the heat acceptor and the temperature of the heat rejector that occur during a sensed collision.

3. A method in accordance with claim 1 and further comprising, while the cooler is maintaining a target temperature at a set point temperature,
   (a) increasing the drive voltage until a collision of a piston or displacer with an internal component of the Stirling machine occurs;
   (b) sensing the collision;
   (c) sensing in response to the sensed collision, coexisting values of the temperature of the heat acceptor, the temperature of the heat rejector and a value representing the drive voltage;
   (d) retrieving from the relational database the value representing the drive voltage that is associated in the relational data base with the sensed values of the temperature of the heat acceptor and the temperature of the heat rejector;
   (e) comparing the retrieved value representing the drive voltage to the sensed value of the drive voltage;
   (f) if the compared values are different, replacing in the database the retrieved value of the drive voltage with the sensed value of the drive voltage;
   (e) repeating the foregoing steps for a plurality of sensed collisions as the machine is operated over a range of heat acceptor temperatures around the set point temperature.

4. A method in accordance with claim 1 wherein the step of interrogating the relational database to retrieve a stored value further includes applying an interpolating algorithm to the stored data to obtain an interpolated value representing drive voltage.

5. A method in accordance with claim 1 wherein the step of applying a drive voltage to the armature winding further includes
   (a) computing a drive voltage from a PID algorithm;
   (b) if the computed drive voltage is less than the drive voltage sensed during calibrating and derived from the retrieved stored value representing the drive voltage, applying the computed drive voltage to the linear motor; and
   (c) if the computed drive voltage is greater than the drive voltage sensed during calibrating and derived from the retrieved stored value representing the drive voltage, applying to the linear motor a drive voltage that is less than the drive voltage sensed during calibrating.

6. A method in accordance with claim 1 and further comprising detecting the occurrence of a collision by:
   (a) sensing an analog signal representing vibrations of the Stirling machine;
   (b) detecting and storing the amplitudes of higher order harmonics of the operating frequency of the Stirling machine that are in the sensed analog signal during operation in the absence of collisions in a calibration mode;
   (c) repeatedly detecting the amplitudes of higher order harmonics during operation of the Stirling machine in a useful work mode;
   (d) comparing the amplitudes stored in the calibration mode to the amplitudes detected in the useful work mode;
   (e) outputting a signal representing the occurrence of a collision when a majority of the amplitudes detected in the useful work mode exceed the amplitudes stored in the calibration mode.

7. A method in accordance with claim 6 wherein the amplitudes stored in the calibration mode are those of even harmonics and the amplitudes detected in the useful work mode are odd harmonics that are adjacent the even harmonics.

8. A method in accordance with claim 7 wherein the occurrence of a collision is detected when at least three fourths (75%) of the amplitudes detected in the useful work mode exceed the amplitudes stored in the calibration mode.

* * * * *